United States Patent Office 3,639,563
Patented Feb. 1, 1972

3,639,563
MOUTHWASH CONTAINING POLYMERIC POLY-OXYETHYLENE NONIONIC SURFACE ACTIVE AGENT AND CHLOROFORM
Joseph Paul Januszewski, Somerville, N.J., assignor to Colgate-Palmolive Company, New York, N.Y.
No Drawing. Continuation of abandoned application Ser. No. 734,544, June 5, 1968. This application July 23, 1970, Ser. No. 57,767
Int. Cl. A61k 7/16
U.S. Cl. 424—49         16 Claims

ABSTRACT OF THE DISCLOSURE

The present invention provides an alcoholic aqueous mouthwash having superior taste characteristics. The mouthwash contains between about 0.5% and 3% of a polymeric polyoxyethylene containing nonionic surface active agent wherein the polyoxyethylene component of the polymer comprises at least about 40% of the polymer. The mouthwash also contains a small effective amount of chloroform to effect a stimulation of the taste characteristics thereof.

---

This application is a continuation of Ser. No. 734,544 filed June 5, 1968 now abandoned.

BACKGROUND OF THE INVENTION

Mouthwashes which are widely used to clean the mouth and associated oral areas must have an attractive flavor to obtain consumer acceptance. The introduction of large amounts of flavoring components and even the introduction of specific flavoring components into alcohol-containing aqueous mouthwashes may introduce problems of compatability with the other mouthwash constituents and may effect the stability of the mouthwash composition. The introduction of flavoring components to attain the desired flavor level may result in formulations which are hazy or which become hazy during storage. Attempts to balance the formulation to overcome or avoid such undesirable side effects concomitant upon the presence of large amounts of flavoring components may introduce other equally undesirable effects. Accordingly, there has been a need for mouthwash formulations having superior flavor characteristics which also have other desirable characteristics, such as good rinsing and cleaning characteristics, anti-bacterial effect, body, etc.

The inclusion of chloroform in the mouthwash formulation in combination with the specified nonionic surface active agent provides the zestful stimulating taste. The nonionic surface active agent, therefore, has a taste effect in co-action with the chloroform. The nonionic is also necessary to provide a clear system. When a polyoxypropylene-polyoxyethylene block polymer having a molecular weight of about 1750 and containing about 20% polyoxyethylene was used in place of one of the nonionic surface active agents specified herein, a cloudy mouthwash was produced with a tendency for one or more oily phases to separate from the aqueous phase upon prolonged standing.

SUMMARY OF THE INVENTION

The present invention provides flavorful alcohol-containing aqueous base mouthwashes containing a small effective amount of chloroform, and between about 0.5% and 3% of a polymeric polyoxyethylene containing non-ionic surface active agent wherein the polyoxyethylene component of said polymer comprises at least about 40% of said polymer. The mouthwashes contain from between about 65% and 85%, preferably between about 68% and 78% water; and between about 5% and 25%, preferably between 10% and 20%, of a non-toxic alcohol. The resultant mouthwash, which may also contain small amounts of additional flavoring agents, has a zestful stimulating taste effect upon the user.

DETAILED DESCRIPTION OF THE INVENTION

The alcoholic aqueous mouthwashes are usually made up on the basis of the other components with the water being the amount necessary to make the composition up to 100%. The water utilized is preferably a deionized or distilled water.

The alcohol component of the moutewash is a non-toxic alcohol such as isopropanol or ethanol, preferably utilizing denaturing components which also function as flavoring agents. These materials are exemplified by the following materials which are approved by the United States Government as additives to beverages: anethol, anise oil, bay oil (cyrcia oil), benzaldehyde, bergamot oil, bitter almond oil, camphor, cedar leaf oil, chlorothymol, cinnamic aldehyde, cinnamon oil, citronella oil, clove oil, coal tar, eucalyptol, eucalyptus oil, eugenol, guaiacol, lavender oil, menthol, mustard oil, peppermint oil, phenol, phenyl salicylate, pine oil, pine needle oil, rosemary oil, sassafras oil, spearmint oil, spike lavender oil, storax, thyme oil, thymol, tolu balsam, turpentine oil, and wintergreen oil. The flavoring agents are used in an amount between about 1% and 2% of the total alcohol content of the mouthwash. When making up the mouthwash composition it is preferable to prepare an alcohol containing about 90% and 93% ethanol, between about 1% and 2% of components functioning as flavoring and denaturing agents, and between about 5% and 10% water.

Alcohol-containing aqueous base mouthwashes containing chloroform in the amounts specified having a zestful and biting characteristic. When a flavor containing mouthwash formulation is modified by adding chloroform, the flavor appears to be accented. The chloroform acts to stimulate the flavor effect. Chloroform has this characteristic in amounts between about 0.05% and 0.65%. The effect increases with increasing chloroform concentration. For most commercial purposes, it is contemplated that between about 0.15% and 0.55% will be used, such as chloroform concentrations of 0.15%, 0.35%, and 0.55%.

The polymeric polyoxyethylene containing nonionic surface active agent wherein the polyoxyethylene component of said polymer comprises at least about 40% of said polymer, is used in an amount between about 0.5% and and 3% of said total composition, with amounts in the lower portion of the specified range being used when the chloroform concentration is relatively low, and in the upper portion of the specified range being used when the chloroform concentration is relatively high.

The polymeric polyoxyethylene containing nonionics include polyoxyethylene-polyoxypropylene copolymers, polyoxyethylene derivatives of sorbitan fatty acid esters, and polyoxyethylene condensates with alkylphenols, e.g., nonylphenol condensed with about 10 moles of ethylene oxide.

The preferred polymeric polyoxyethylene containing nonionic surface active agents, which include solid and paste materials, are:

(1) Polyoxypropylene-polyoxyethylene block polymers having the formula

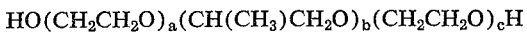

wherein $a$, $b$, and $c$ are integers reflecting the respective polyethylene oxide and polypropylene oxide blocks of said polymer. The polyoxyethylene component of said block polymer constitute at least about 40 percent of said block polymer. The polymer preferably has a molecular weight of between about 1,000 and 4,000. Although these polymers are effective over the range specified with all chloroform concentrations, they are preferred in amounts in excess of 1% and preferably between 2% and 3% when the chloroform concentration is in excess of 0.3%. These materials are well known in the art and are available under the trademark "Pluronics." The pluronic materials described herein include F 68, P 65, P 105, L 44, P 104, F 98, F 108 and F 127. Reference to the molecular weight refers to the molecular weight of the polyoxypropylene hydrophobic portion of the molecule. The polyoxyethylene portion is described in terms of percent by weight of the molecule.

(2) Polyoxyethylene derivatives of sorbitan mono- and tri-fatty acid esters wherein the fatty acid component has between 12 and 24 carbon atoms. The preferred polyoxyethylene derivatives are of sorbitan monolaurate, sorbitan monopalmitate, sorbitan monostearate, sorbitan tristearate, sorbitan monooleate, and sorbitan trioleate. The polyoxyethylene chains contain between about 4 and 20 ethylene oxide units, and preferably about 20. The sorbitan ester derivatives contain 1, 2, or 3 polyoxyethylene chains dependent upon whether they are mono, di, or tri acid esters. These polyoxyethylene sorbitan derivatives are used in mouthwashes containing relatively low chloroform concentrations, e.g., about 0.05% to 0.2% chloroform, in amounts between about 0.6% and 1.5% and preferably between about 0.7% and 1.1% of said sorbitan derivative.

The mouthwash compositions preferably contain glycerine in amounts up to about 15%, with compositions containing between about 8% and 12% having particularly desirable characteristics. The glycerine functions to supply "body" to the composition. It may be replaced in whole or in part by such equivalent materials as sorbitol or propylene glycol.

The mouthwash composition may also optionally contain small effective amounts of anti-bacterial agents such as the quaternary ammonium compounds and the substantially saturated aliphatic acyl amides. Preferred additions of these agents are in amounts between about 0.05% and 0.1%. The following are illustrative of the useful anti-bacterial agents: benzethonium chloride, diisobutyl phenoxy ethoxy ethyl dimethyl benzyl ammonium chloride, N-alkylpyridinium chloride, N-cetyl pyridinium bromide, sodium N-lauroyl sarcosine, sodium N-palmitoyl sarcosine, lauroyl sarcosine, sodium N-myristoyl glycine, and potassaium N-lauroyl sarcosine.

The mouthwash compositions will usually also contain adjuvant materials to provide color, additional flavoring if desired, and sweetening effects. Color is typically added in an amount up to about 0.01%. Additional flavor or sweetener, such as saccharin, is preferably added in small amounts, e.g., about 0.04%.

The mouthwash composition is prepared by combining the specified components in an amount of water sufficient to bring the total of the components to 100%. The sequence of addition of the various components is not critical. All the mouthwash components may be dissolved in water. It is preferred to admix the alcohol soluble components in the alcohol and then add water. Components of the mouthwash composition which have greater solubility in water than alcohol are preferably added to the water before it is admixed with the alcohol or added to the composition after the water addition.

The chloroform being volatile is preferably added in amounts in excess of that desired in the completed mouthwash. This may introduce some variations in the product. The chloroform is preferably added last to minimize losses. All chloroform concentrations specified herein in excess of 0.1% chloroform are to be understood to be plus or minus 0.05%, with a smaller tolerance at lower levels.

The following specific examples are further illustrative of the nature of the present invention but the invention is not limited thereto. All amounts and percentages throughout the specification and in the claims are by weight unless otherwise indicated.

EXAMPLE 1

An aqueous mouthwash was prepared by adding the nonionic, benzethonium chloride and glycerine to flavored alcohol, and mixing. The specified amount of water was then added, followed by sequential addition of saccharin, coloring ingredients, and chloroform. The entire composition was mixed and then filtered.

| Ingredients | Percent by weight |
|---|---|
| Denatured alcohol | 15 |
| Water (deionized) | 72 |
| Glycerine | 10 |
| Benzethonium chloride | 0.075 |
| Saccharin (Na) | 0.04 |
| Color | 0.08 |
| Chloroform | 0.55 |
| Nonionic | 2 |

The nonionic was a polyoxypropylene-polyoxyethylene block polymer (molecular weight 1750) in which the polyoxyethylene component was 80 percent of the total molecule. The denaturing components of the ethanol contained flavoring materials. The aqueous mouthwash had excellent flavor combined with a zestful stimualting effect upon the user. The mouthwash was a clear solution with a blue tint. It retained these desirable characteristics during prolonged storage.

Similar mouthwashes were made up having the same desirable properties using polyoxypropylene-polyoxyethylene block polymers having the following characteristics, in place of that specified in the preceding paragraph: (1) a polyoxyethylene content of 50 percent and a molecular weight of 1750; (2) a polyoxyethylene content of 50 percent and a molecular weight of 3250; (3) a polyoxyethylene content of 40 percent and a molecular weight of 1200; (4) a polyoxyethylene content of 40 percent and a molecular weight of 1750; and (5) a polyoxyethylene content of 40 percent and a molecular weight of 3250.

EXAMPLE 2

A mouthwash was prepared having the formulation of Example 1 with exception that a small amount of flavoring agent in addition to those included among the denaturing components of the ethanol, was added. A polyoxypropylene-polyoxyethylene block polymer containing about 80 percent of polyoxyethylene and a molecular weight of about 1750 was used as the nonionic in an amount of 3%. The aqueous mouthwash had the desirable taste characteristics discussed in connection with Example 1, with a somewhat more pronounced flavor.

EXAMPLE 3

A mouthwash was prepared with the same components as in Example 1 except that the chloroform concentration was 0.35%. The mouthwash had a similar appearance to that of Example 1, was less "biting" and had otherwise similar taste characteristics. Similar mouthwashes were prepared using a polyoxypropylene-polyoxyethylene block polymer containing 80 percent of polyoxyethylene and having a molecular weight of 2750, and another having an 80 percent polyoxyethylene content with a molecular weight of 3250.

EXAMPLE 4

A number of aqueous mouthwashes having the desired appearance and storage characteristics and having excellent flavor characteristics were prepared using the formulation of Example 1, with somewhat lower chloroform and nonionic concentrations. The chloroform concentration was 0.15%. Mouthwashes were prepared using 1% and 1.5% of a polyoxypropylene-polyoxyethylene block polymer containing 80 percent of polyoxyethylene and having a molecular weight of 1750. Other mouthwashes were prepared containing 0.8%, 1%, and 1.5% of a polyoxypropylene-polyoxyethylene block polymer containing 70 percent of polyoxyethylene and having a molecular weight of 4000. All of these mouthwashes had excellent taste characteristics and were stimulating and zestful. They were somewhat less biting than the mouthwashes of Examples 1-3.

EXAMPLE 5

A mouthwash was prepared having the formulation of Example 1 with the exception that the chloroform concentration was 0.15 percent and the nonionic was a polyethylene condensate of sorbitan monooleate containing about 20 moles of ethylene oxide. Mouthwashes were prepared with the nonionic in amounts of 0.7%, 0.8%, and 1.1%. All of these mouthwashes were flavorable and had a stimulating taste effect, although somewhat milder than the mouthwashes of Examples 1, 2 and 3.

Similar mouthwashes were prepared with 0.15 chloroform using sorbitan monostearate, and sorbitan monolaurate, each condensed with about 20 moles of ethylene oxide, as the nonionic. The resultant mouthwashes had excellent taste characteristics.

EXAMPLE 6

A mouthwash having a chloroform content of about 0.1% was prepared with the nonionic of the first paragraph of Example 5 in amounts of about 0.7%. The resultant mouthwash was similar to that described in the first paragraph of Example 5.

The benzethonium chloride was included in the exemplified mouthwashes as an anti-bacterial agent. Other antibacterial agents, such as those disclosed hereinbefore, could be used in place of the benzethonium chloride when a mouthwash having anti-bacterial properties is desired. The mouthwashes exemplified are of preferred formulations. Other formulations with differing amounts of water, ethanol, glycerine, and flavoring agents, within the broad and preferred ranges specified herein, are found to have the desirable properties described for the exemplified mouthwashes.

Although the present invention has been described with reference to particular embodiments and examples, it will be apparent to those skilled in the art that variations and modifications of this invention can be made and that equivalents can be substituted therefor without departing from the principles and true spirit of the invention.

What is claimed is:

1. An aqueous mouthwash having superior taste characteristics containing between about 65% and 85% water, between about 5% and 25% of a non-toxic alcohol, between about 0.5% and 3% of a polymeric polyoxyethylene containing nonionic surface active agent selected from the group consisting of polyoxyethylene-polyoxypropylene block copolymers having a molecular weight between about 1,000 and 4,000, polyoxyethylene derivatives of sorbitan fatty acid esters wherein the fatty acid component contains between about 12 and 24 carbon atoms and the polyoxyethylene chain has between 4 and 20 ethylene oxide units and polyoxyethylene condensates with alkyl phenols wherein the alkyl group contains about 9 carbon atoms and the polyoxyethylene chain has about 10 ethylene oxide units, wherein the polyoxyethylene component of the nonionic surface active agent polymer comprises at least about 40% of the polymer, and a small effective amount of chloroform to effect a stimulation of the taste characteristics of said mouthwash.

2. The aqueous mounthwash of claim 1 wherein said non-toxic alcohol is denatured ethanol, said chloroform concentration is between about 0.05% and 0.55% and said mounthwash contains flavor and at least one material selected from the group consisting of glycerine, sorbitol, and propylene glycol, in an amount up to about 15%.

3. The aqueous mounthwash of claim 2 wherein said polymeric polyoxyethylene containing nonionic surface active agent is a polyoxypropylene-polyoxyethylene block polymer having a molecular weight between about 1,000 and 4,000.

4. The aqueous mounthwash of claim 2 wherein said polymeric polyoxyethylene containing monionic surface active agent is a polyoxyethylene derivative of a sorbitan fatty acid ester wherein the fatty acid component contains between about 12 and 24 carbon atoms and the polyoxyethylene chain has between 4 and 20 ethylene oxide units.

5. The aqueous mounthwash of claim 2 containing between about 68% and 78% water, between about 0.5% and 3% of a polyoxypropylene-polyoxyethylene block polymer having a molecular weight of between about 1,000 and 4,000, as said nonionic surface active agent, and said material is glycerine.

6. The aqueous mouthwash of claim 5 containing between about 10% and 20% ethanol, between about 8% and 12% glycerine, and a small amount of saccharin flavor.

7. The aqueous mounthwash of claim 6 containing in excess of 1% of said polyoxypropylene-polyoxyethylene block polymer, and in excess of 0.3% chloroform.

8. The aqueous mounthwash of claim 7 containing about 72% water, about 15% ethanol, and about 10% glycerine.

9. The aqueous mouthwash of claim 8 containing between about 2% and 3% of said polyoxypropylene-polyoxyethylene block copolymer, and about 0.35% chloroform.

10. The aqueous mouthwash of claim 8 containing between about 2% and 3% of said polyoxypropylene-polyoxyethylene block copolymer, and about 0.55% chloroform.

11. The aqueous mouthwash of claim 2 containing between about 68% and 78% water, between about 0.6% and 1.5% of a polyoxyethylene derivative of a sorbitan mono fatty acid ester wherein the fatty acid component contains between about 12 and 24 carbon atoms and the polyoxyethylene chain has between 4 and 20 ethylene oxide units as said nonionic surface active agent, and between about 0.05% and about 0.2% chloroform, and said material is glycerine.

12. The aqueous mouthwash of claim 11 containing between about 10% and 20% ethanol, between about 8% and 12% glycerine, and a small amount of saccharin flavor.

13. The aqueous mouthwash of claim 12 containing between about 0.7% and about 1.1% of a polyoxyethylene derivative of a sorbitan mono fatty acid ester containing about 20 moles of ethylene oxide.

14. The aqueous mouthwash of claim 13 wherein said sorbitan fatty acid ester is sorbitan monooleate.

15. The aqueous mouthwash of claim 13 wherein said sorbitan fatty acid ester is sorbitan monostearate.

16. The aqueous mouthwash of claim 13 wherein said sorbitan fatty acid ester is sorbitan monolaurate.

No references cited.

RICHARD L. HUFF, Primary Examiner

UNITED STATES PATENT OFFICE
CERTIFICATE OF CORRECTION

Patent No. 3,639,563  Dated February 1, 1972

Inventor(s) Joseph Paul Januszewski

It is certified that error appears in the above-identified patent and that said Letters Patent are hereby corrected as shown below:

Column 3, Line 5, cancel "Pluronics" and insert --Pluronic--.

Column 3, Line 6, cancel "pluronic" and insert --Pluronic--.

Column 5, Line 54 (Claim 1, Line 7) before "molecular" insert --polyoxypropylene--.

Column 6, Line 10 (Claim 3, Line 4) before "molecular" insert --polyoxypropylene--.

Column 6, Line 21 (Claim 5, Line 4) before "molecular" insert --polyoxypropylene--.

Signed and sealed this 9th day of January 1973.

(SEAL)
Attest:

EDWARD M. FLETCHER, JR.
Attesting Officer

ROBERT GOTTSCHALK
Commissioner of Patents